United States Patent [19]

Anderson et al.

[11] 3,962,485

[45] June 8, 1976

[54] METHOD FOR FORMING UNIFORM STRESS-FREE THIN FILMS

[75] Inventors: Gordon Wood Anderson, Washington, D.C.; John E. Davey, Alexandria, Va.; Howard L. Grant, Bradenton, Fla.

[73] Assignee: The United States of America as represented by the Secretary of the Navy, Washington, D.C.

[22] Filed: Oct. 20, 1975

[21] Appl. No.: 624,201

[52] U.S. Cl. .................................. 427/9; 156/246; 427/86; 427/123; 427/124; 427/126
[51] Int. Cl.² ........................................ B05D 5/12
[58] Field of Search ............ 156/246; 427/123, 124, 427/126, 86, 9

[56] References Cited
UNITED STATES PATENTS 3,912,462  10/1975  Balthis et al. ...................... 427/124

OTHER PUBLICATIONS

Anderson, G.W. et al., *Optical and Electrical Properties of Boron–Implanted Amorphous Germanium Thin Films*, in Journal of Applied Physics, 45(10): pp. 4528–4532, Oct. 1974.

*Primary Examiner*—Cameron K. Weiffenbach
*Attorney, Agent, or Firm*—R. S. Sciascia; Philip Schneider; Melvin L. Crane

[57] ABSTRACT

Stress free films of metals, semi-conductors and insulators which have a very uniform thickness and composition and which are supported independent of a substrate, and the method of forming same. Such films have wide application for reflection of light as mirrors and transmission or absorption of light in the form of filters throughout the complete optical spectrum. Also, such films may be used for the study of fundamental properties of the material in question.

7 Claims, 3 Drawing Figures

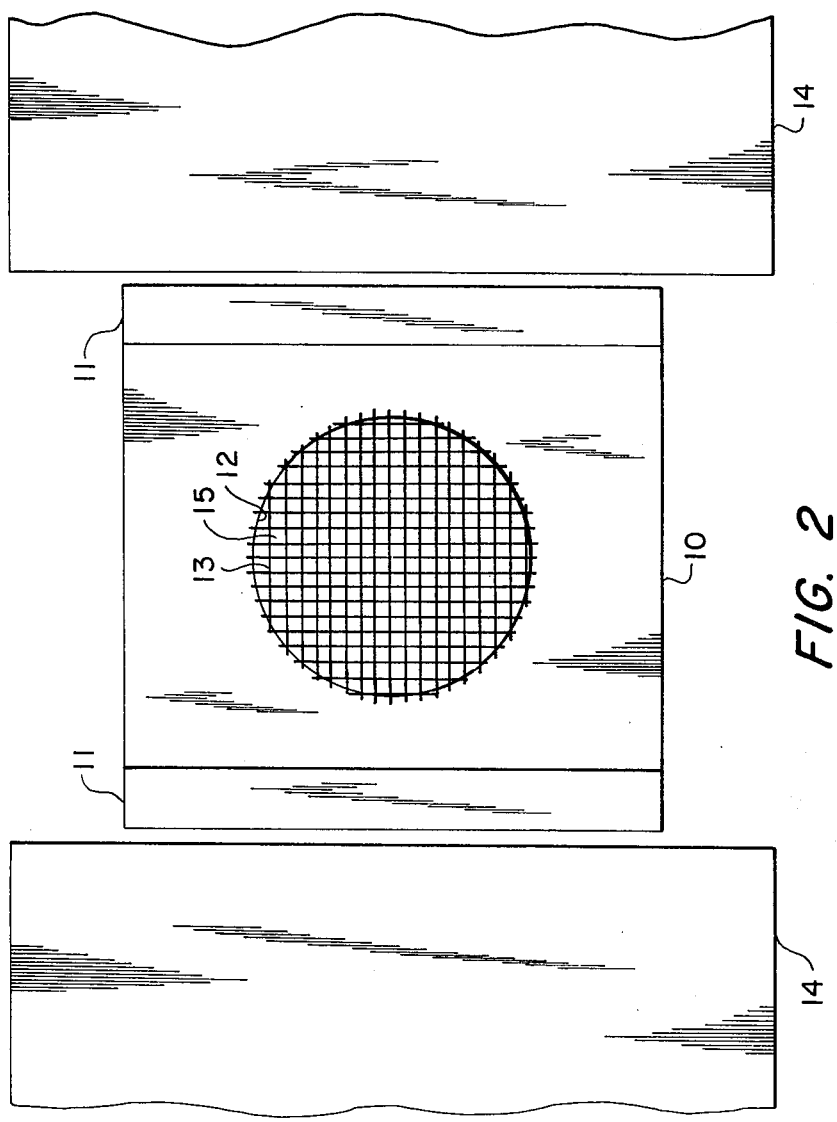
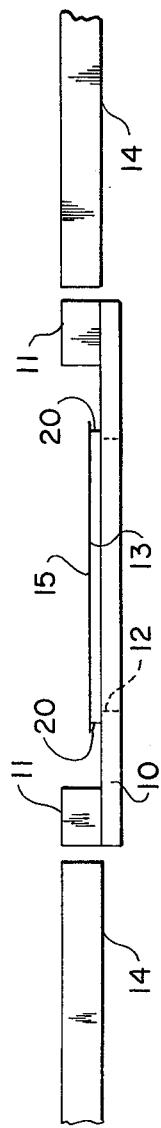
FIG. 1
FIG. 2

METHOD FOR FORMING UNIFORM STRESS-FREE THIN FILMS

BACKGROUND OF THE INVENTION

This invention relates to thin films and more particularly to the method of forming uniform, stress-free, thin films of metals, semiconductors and insulators.

Heretofore thin films for various optical uses have been formed upon a substrate for support. In many cases such thin films are not thermally compatible with the substrate thereby producing undue stress or strain, defect generation in the films and in severe cases cracking and/or peeling of the film from the substrate. Further, substrates limit the optical radiation range over which thin films thereon may be studied or operationally applied.

SUMMARY OF THE INVENTION

This invention provides thin films of metals, semiconductors, and insulators which may be useful throughout the optical spectrum. The films are stress free, uniform, and may be extensively handled without deleterious effects on the film.

BRIEF DESCRIPTION OF THE DRAWINGS

FIG. 1 illustrates a schematic view of a film made in accordance with the teaching of this invention in combination with adjacent glass plates upon which films are simultaneously deposited for comparative film thickness measurements after deposition.

FIG. 2 is a cross sectional view of FIG. 1.

DETAILED DESCRIPTION

Figure 3:
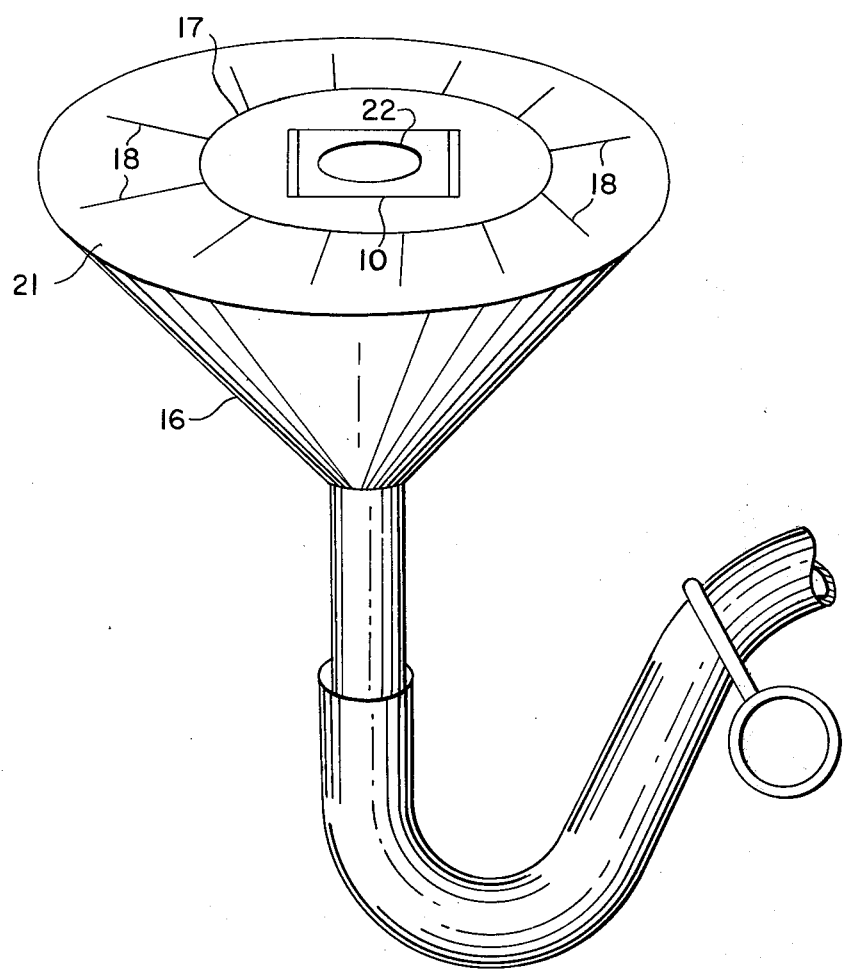
FIG. 3 illustrates a device used in placement of a collodion film onto a grid upon which thin films are deposited.

In carrying out the method of forming a uniform thickness, stress-free thin film, a 7 mil tantalum ½-in. × ½-in. plate 10 or any other suitable material plate is secured to thicker tantalum edge bars 11 for strengthening the device for handling and for film protection. The tantalum plate is provided with a centrally located 6–7 mm aperture 12 therein across which a grid such as a 100-mesh molybdenum microscope grid 13 is secured. Optically flat glass plates 14 are shown placed adjacent the grid which are used for evaluation of the film profile following deposition of a film 15 onto the grid structure.

The above structure is shown in FIGS. 1 and 2. The grid 13 and film 15 are indistinguishable in FIG. 2 since they are so thin they appear as one. The lines 20 near the end of the grid-film structure represent weld points and are exaggerated for clarity.

FIG. 3 illustrates a glass funnel 16 which contains a screen wire 17 which extends partially across the inner diameter of the funnel near the upper edge thereof. The screen has metal legs 18 attached to the edge thereof to provide a steady support for the screen wire within the funnel. The screen is supported at a very slight angle to the plane of the top of the funnel, and the funnel is supported exactly vertically with the top in a horizontal plane.

In carrying out the method of this invention, the tantalum plate −100 mesh molybdenum microscope grid mounted structure 10 and the screen wire in the funnel are previously cleaned in acetone and then ethyl alcohol. The grid structure is placed onto the central area of the screen wire 17. Two to four grid structures 10 may be placed onto the screen simultaneously, if desired. The funnel is then filled with deionized water 21 to about ¼-inch above the grid structure 10 supported by the screen 17. Care is taken so that no air bubbles remain in the water near the grid structure. The screen wire is placed at a slight angle in the funnel to aid in preventing such air bubbles. A collodion film 22 (10% collodion, 90% iso-amyl acetate by volume solutions are most suitable in ultra high vacuum environments) is suspended upon the surface of the water in the area above the molybdenum grid-tantalum structure. Typically three drops of the solution may be placed onto the water surface directly above the grid or grids. The solution then spreads over the water surface and dries to a substantially uniform thickness. The collodion film is of about the proper thickness when the film appears to be light straw in color when illuminated by white light. Once the collodion film has spread upon the surface of the water above the grid, the deionized water is slowly released through the bottom of the funnel by an appropriate release mechanism. As the water is released, the collodion film settles onto the microscope grid supported by the tantalum plate on the screen within the funnel. The collodion film thus settles sequentially onto the grid from the upper to lower parts of the grid due to the sloping screen as the water is slowly released. Care is exercised in this operation to ensure exclusion of defects or folds in the film as the film settles over the grid area. The grid suspended film is allowed to dry after a visual inspection by a magnifying glass to determine if any defects are in the film. The collodion will be about the same thickness throughout and will provide a flat surface upon which a metal, semiconductor, or insulator film is deposited by use of an appropriate deposition process.

As an example of forming an uniform, stress-free, thin film of an amorphous germanium film, the molybdenum grid-tantalum structure with the collodion film deposited thereon is placed into an ultra high vacuum system for deposition of the germanium film. The germanium is deposited at a slow deposition rate of from 1–10 angstroms per second with the collodion-grid support at least 6 cm and typically 10 cm or more from the germanium source to ensure uniform deposition. The collodion-grid support is held at 30°–40°C during deposition. The optically flat plates 14 as shown in FIG. 1, are placed along the collodion-grid structure in the deposition chamber for simultaneous germanium film deposition for subsequent evaluation purposes after deposition. During deposition operation, the glass plates and the collodion film simultaneously receive a germanium film thereon. The film is deposited until a thickness of from 2000 A to above 3000 A is obtained or any other desired thickness. Once the germanium film has been deposited onto the collodion-grid structure, the film coated structure is removed from the vacuum system and placed into an acetone vapor bath for about 30 minutes to remove the collodion from under the film. As the collodion is removed, the germanium deposited film settles onto the molybdenum grid and upon complete removal of the collodion the deposited film is ready for use in any desired system. Molybdenum has substantially the same thermal expansion coefficients as that of the germanium film; therefore, the film and grid are compatible for temperatures from 0°K to 900°K or more. Further, since the support structure for the film is a grid, the stress and strain effects will be different from that of a substrate normally used in the prior art and in fact will be essentially negligible.

After deposition of the germanium film and removal of the collodion film, the two glass plates and the grid structure are routinely scanned in single traces with a Joyce-Loeble III CS recording double beam microdensitometer which measures optical density in the visible wavelength range, the optical density being linearly proportional to the thickness in this range for amorphous germanium. From extremely accurate interferometric measurements of the film thickness at specific points on the glass substrates and from the microdensitometer traces passing through these same points and the stress-free, free floating, grid supported film, quantitative determinations of the grid supported film thickness and uniformly are obtained. It has been determined that film thickness was uniform within 30 A over the grid area for films about 2000 A to 3000 A thick.

The example above has been set forth using amorphous germanium. Films of metals, semiconductors and insulators of other materials may be formed in the same manner. Other methods of deposition and thickness measuring techniques may be used as well known in the art. However, the deposited films must be formed onto a grid supported film which may be dissolved subsequent to deposition of the material as set forth above and the supporting film removed to leave the deposited film supported by the grid alone. Solvents used must not harm the deposited films. Also, instead of a molybdenum grid, grids of other materials may be used. The materials of the grids used must be thermally compatible with the film deposited for use of the film over wide temperature ranges. In carrying out the method of this invention, films may be formed by which the optical transmission properties of a given film may be studied throughout the optical spectrum from the far ultraviolet and soft x-ray region through the far infrared region.

The size of the tantalum plate and other dimensions are representative and may be changed as desired. The invention has been set forth in separate publications: *Journal of Applied Physics*, Vol. 45, No. 10, pps. 4528–4532, October 1974; and *Applied Optics*, Vol. 14, No. 9, pps. 2057–2058, September 1975.

Films formed by the above method may be used as optical filters, laser windows, etc., and allow for optical transmission characterization of the films throughout the optical spectrum from the soft x-ray region through the far infrared region (0.01–2000 $\mu$m).

Obviously many modifications and variations of the present invention are possible in light of the above teachings. It is therefore to be understood that within the scope of the appended claims the invention may be practiced otherwise than as specifically described.

What is claimed and desired to be secured by letters patent of the United States is:

1. A method of forming uniform, stress-free, thin films of metals, semiconductors, and insulators which comprises:
    supporting a collodion film on a fine mesh grid of a grid structure;
    supporting said grid structure within a material deposition system;
    depositing a film of a desired material of a desired thickness onto said collodion film on said grid;
    subsequent to deposition of said film of a desired material onto said collodion, removing said collodion film thereby leaving said film of a desired material supported by said grid.

2. A method as claimed in claim 1, wherein,
    said film of a desired material is deposited onto said collodion in a vacuum deposition system with a deposition rate of from 1–10 Angstroms/sec.

3. A method as claimed in claim 1; wherein,
    said collodion film consists of 10% collodion and 90% isoamyl acetate by volume solution.

4. A method as claimed in claim 1; wherein,
    said collodion is removed by placing said fine mesh grid structure into an acetone vapor bath for sufficient time to remove said collodion film and then removing said grid with said deposited film of material on said grid.

5. A method as claimed in claim 1; in which,
    said fine mesh grid is formed of a material having a similar thermal expansive coefficient as that of said material to be deposited onto said collodion film.

6. A method as claimed in claim 1; wherein,
    simultaneous with supporting grid within said material deposition system;
    supporting a pair of glass plates with one plate along opposite sides of said grid support for depositing material thereon simultaneous with deposition of said material onto said collodion film for quantitative determination of film uniformity and thickness; and
    measuring the thickness of said deposited material.

7. A method as claimed in claim 3; which includes,
    securing a fine mesh grid to a supporting plate;
    placing said grid-supporting plate into a container with said grid supporting plate supported in substantially a horizontal plane;
    filling said container with dionized water completely covering said grid supporting plate and grid;
    spreading said collodion onto the surface of said deionized water in the area above said grid-supporting plate; and
    slowly draining said water from said container thereby permitting said collodion to settle onto said grid of said supporting plate thereby supporting said collodion film on said grid.

* * * * *